United States Patent [19]
Williams

[11] 3,817,093
[45] June 18, 1974

[54] SEAT BELT WEBBING TENSION MEASURING DEVICE

[75] Inventor: Charles E. Williams, Westland, Mich.

[73] Assignee: Ford Motor Company, Dearborn, Mich.

[22] Filed: Oct. 5, 1972

[21] Appl. No.: 295,376

[52] U.S. Cl. ................................................. 73/144
[51] Int. Cl. .............................................. G01l 5/10
[58] Field of Search ................ 73/144, 99, 100, 143

[56] References Cited
UNITED STATES PATENTS
3,426,589  2/1969  Brendel.................................. 73/144
3,618,378  11/1971  Shull et al............................. 73/144

Primary Examiner—Jerry W. Myracle
Attorney, Agent, or Firm—Keith L. Zerschling; Joseph W. Malleck

[57] ABSTRACT

A transducer for measuring seat belt loads comprising a yoke having a pair of spaced arms commonly connected at a crotch portion: a fence element adapted to nest within and between the arms of the yoke for guiding the seat belt against the interior surfaces of the arms and crotch of said yoke. The yoke is floatingly restrained against one side of the seat belt and tension loads applied to the belt are effective in applying force at the outer extremites of the yoke arms so as to move them apart applying compression at a central region of the yoke. Strain gauges are embedded within the central region of the yoke to sense compression as well as "poisson" tension; means are provided for converting the strain gauge signal to an indication proportional to the amount of load on said seat belt.

11 Claims, 11 Drawing Figures

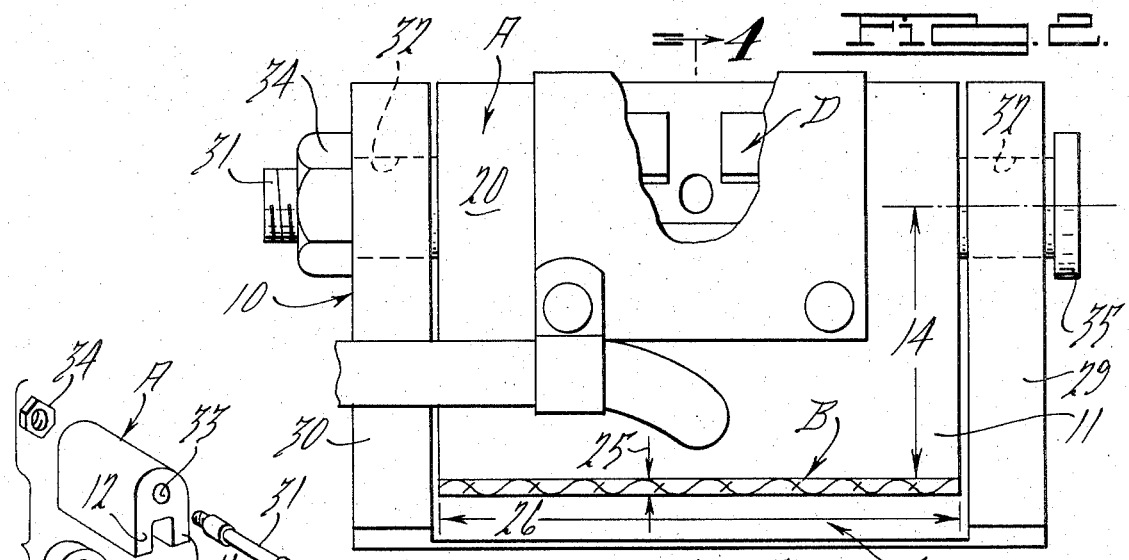
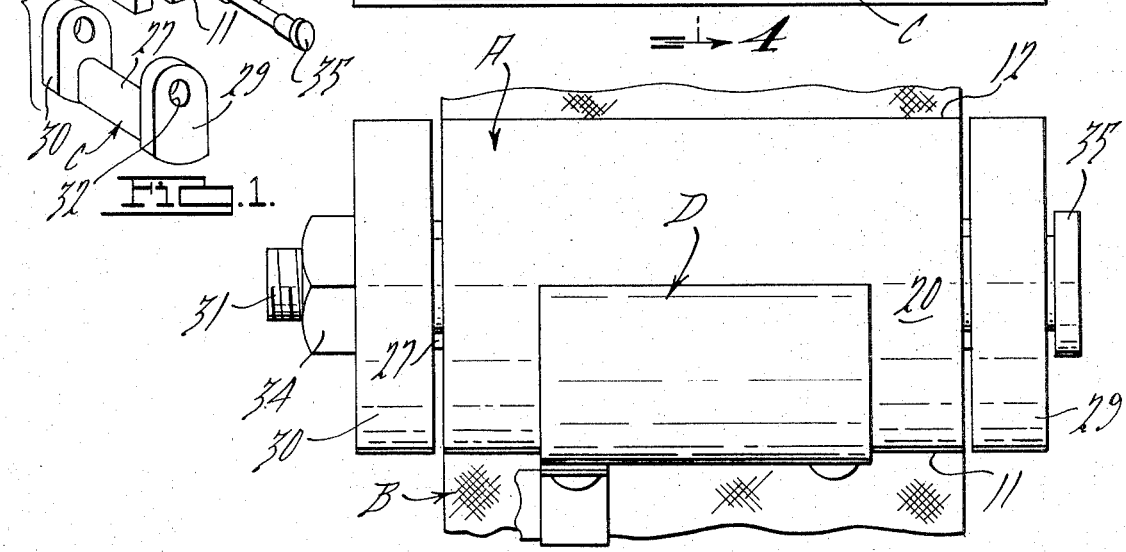
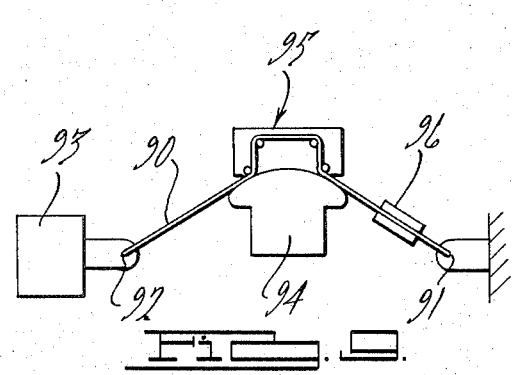
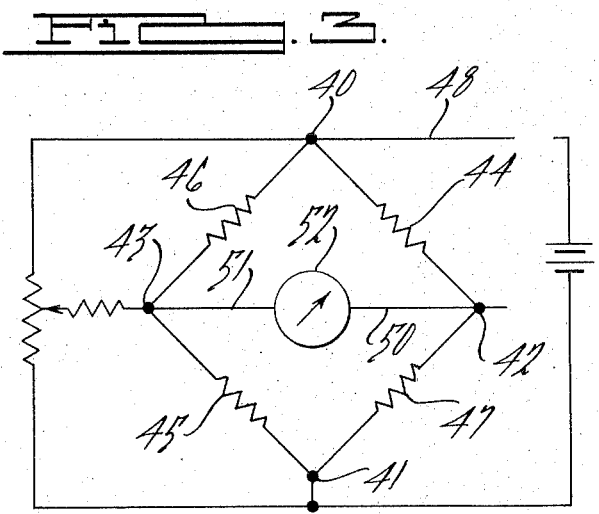

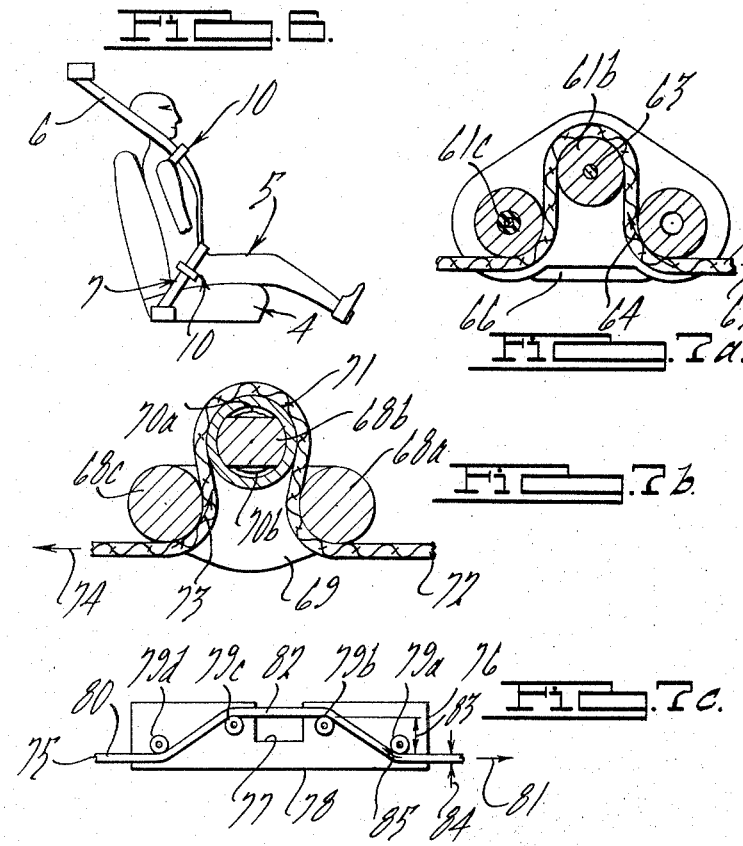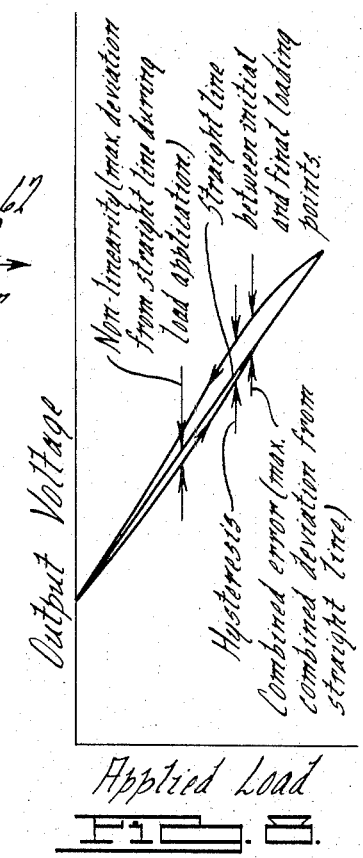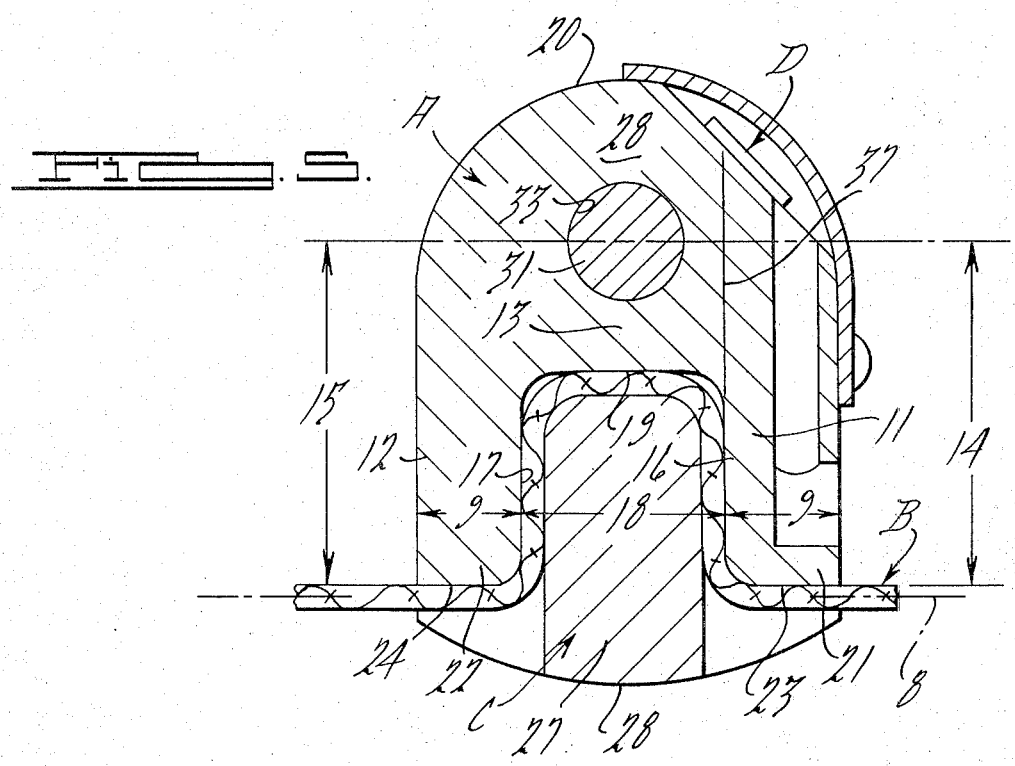

SEAT BELT WEBBING TENSION MEASURING DEVICE

BACKGROUND OF THE INVENTION

A seat belt transducer measures tension forces occurring in the seat belt webbing in response to the inertial movement of a belted dummy during staged vehicular impact tests. Transducer designs to date, and particularly those in commercial use, work on the principle of exerting a bending force upon a mass of material having rods or rollers connected thereto at spaced points and about which the belt is threaded. Suitable strain gauges are disposed at regions of stress within the mass and the gauges are wired to form a wheatstone bridge the bridge output being proportional or related to the bending moment within the mass of the material, which in turn is proportional to the webbing tension.

Certain disadvantages are common to all of these prior art devices while additional disadvantages pertain to certain of the devices. Universal disadvantages comprise (a) the sensitivity to contact by outside bodies against elements of the transducer distorting the signal; such contact can occur by way of dummy or vehicle components resting lightly against a portion of the transducer encouraged by the close fit available to accept the transducer; (b) the inability of the devices to transmit forces proportional to pure tensile forces to regions sensed by the strain gauges without interference from frictional forces; (c) the inability of a given device to accommodate various belt sizes (particularly varying in thickness) with equal accuracy in sensing tension; (d) the inability to possess a high degree of fool proof assembly whereby an untrained person can assemble the transducer without special instructions; and (e) the lack of a high degree of permanency in position when installed on the belt (both in the tension-on and tension-off conditions of the belt) so that the transducer does not shift longitudinally on the belt.

A typical example of the prior art is disclosed in U.S. Pat. No. 3,426,589 which structure is comprised of two rigid side members (a central region of each side member operates as the mass of material to be strained as a beam) connected by four rods serving as spacers and about which the belt is interleaved. Since the central two rods are off-set transversely from the outer rods, tensile loading on the seat belt will cause the belt to urge the outer rods in one direction thereby loading the side members in said one direction with the central rods urged in an opposite direction thereby loading the central region of side members in said opposite direction. This particular transducer is extremely sensitive to both belt thickness and the amount of rod off-set between the outer and central rods. Such sensitivity makes it difficult to obtain a reliable and accurate signal from the transducer. Contact by the test dummy or by an outside force with any portion of the device (such as the side member or a rod) will cause strain on the side members to be distorted. The device requires a relatively large amount of space to accommodate the four rods and therefore the opportunity for such contact is greatly increased making installation of the device on a particularly short length of belt extremely difficult. The device is easily moved on the belt (sliding longitudinally therealong) increasing the opportunity for unwanted contact.

Another prior art device is that shown in U.S. Pat. No. 3,618,378 which again utilizes a pair of side members, the members being interconnected by spacer rods and about which the belt is threaded to obtain strain in the members. Because of the isosceles arrangement of the spacer rods, interference from friction forces has been somewhat reduced and the device has been made somewhat more compact, but is still subject to various disadvantages: (a) the inability to accommodate various belt thicknesses without changes in sensitivity, (b) distortion of output signal by contact with either of the side members thereby changing the strain pattern, (c) requires special threading of the belt preventing full-proof use, and (d) the opportunity for sliding on the belt after being installed. Most notable is the additional deficiency that the small mass of highly stressed material (acting as a side member) can be subject to disintegration under overload; this is due in part to the use of a hard material to increase the sensitivity of the gauge.

SUMMARY OF THE INVENTION

It is a primary object of this invention to overcome the above disadvantages and principally to provide a transducer which provides (a) a linear output when used with belts of all types including the energy absorbing type, and (b) a substantial reduction in hysteresis overcoming frictional force interference and thereby increasing the accuracy of measurement.

In addition, the present invention is adapted to provide a transducer usable in any belt location and is significantly unaffected by dummy or vehicular contact. The transducer provides for a substantially fool-proof installation, accommodates belts of varying thicknesses without affecting measurement capability, and requires less installation space on the belt than known devices.

Particular features which implement the above objects of the invention comprise: a bi-partite assembly including a yoke having a pair of arms commonly connected at a crotch thereof, the yoke being disposed totally against one side of the belt with no portion thereof extending to the other side. A fence element provides the second part and is adapted to nest within the space between the arms of the yoke for guiding the seat belt in a specialized path against the interior surfaces of the yoke arms. As a result, frictional contact between the belt and the yoke is directed substantially through a central region of the yoke where the strain gauges are intentionally located. This location eliminates the possibility of substantial force couples (due to friction) detracting from the measurement capability of the strain gauges. Furthermore, the fence element is adapted by geometry to turn the belt in an abrupt path through the transducer so that there will be little frictional force components opposing tension in the belt.

The disposition of the yoke element totally on one side of the belt in a restrained floating manner significantly eliminates the disadvantage of measurement interference by outside contact. Should contact take place, the floating yoke element shifts as a unit without stress in a component thereof. Again due to the floating concept of the yoke, various types of belt thicknesses can be accommodated with ease without affecting the measurement capability. With the present invention, it is impossible to place a flat belt in the transducer in a wrong position. The path of the belt abruptly traverses

SUMMARY OF THE DRAWINGS

FIG. 1 is a view of the components of a preferred embodiment shown in exploded perspective;

FIG. 2 is an elevational view of the preferred embodiment showing the components of FIG. 1 assembled;

FIG. 3 is a plan view of the assembly of FIG. 2;

FIG. 4 is a schematic illustration of electrical circuitry for the gauges embodied in FIG. 1;

FIG. 5 is a sectional view of the structure of FIG. 1 taken substantially along line 4-4 and illustrating a seat belt assembled therethrough;

FIG. 6 is a schematic illustration of transducer devices of this invention mounted on a typical vehicular harness illustrated as applied about a dummy in seated position;

FIGS. 7a–7c is a series of schematic illustrations of prior art devices;

FIG. 8 is a graphical illustration of test data for the prior art device of FIG. 7a showing applied load plotted against output voltage of the transducer, thereby depicting hysteresis as well as the degree of nonlinearity of the device; and FIG. 9 is a schematic illustration of a test set-up for measuring the influence of outside load applied to the transducer device.

Referring now the drawings, and particularly the FIGS. 1–4, there is illustrated a preferred embodiment of this invention which broadly comprises a transducer 10 having a yoke A adapted to resrictively float against one side of a seat belt or strand B, guide means C (in the form of a fence element) is disposed on an opposite side of the seat belt adapted to urge the belt against the interior surfaces of the yoke. Means D is disposed in a select region of the yoke to be responsive to stress therein and render a signal proportional to the load on the seat belt. The transducer 10 is useful in measuring tensile loads on seat belt B having an extended disposition such as shown in FIG. 6 wherein a waist harness 7 and shoulder harness 6 is shown about a dummy 5.

The yoke A comprises a U-shaped member having arms 11 and 12 radiating from a common crotch 13, the arms have an effective lever length 14 and 15 respectively, and each arm has a generally flat interior surface 16 and 17 respectively. The crotch 13 has a width dimension 18 generally commensurate with width 9 of each of the arms. The crotch has an inner surface 19 curvingly merging with the flat surfaces of the arms to define a continuous smooth inner cavity showing surfaces against which the seat belt may bear. The crotch has a curved outer surface 20. The region 28 of the crotch will endure strain upon spreading apart of arms 11 and 12. Feet 21 and 22 respectfully on said arms have flat surfaces 23 and 24 disposed parallel to the general extended direction 8 of the seat belt outside of the transducer assembly.

Yoke A is adapted to operate with a conventional seat belt having a flat configuration whereby the belt thickness 25 is considerably smaller than the width dimension 26, the length of the seat belt being dimensioned for the specific application.

The guide means C is disposed against the opposite side of the belt and comprises a fence element 27 projecting upwardly from a slightly curved base surface 28. The fence element spans between two integral end walts 29 and 30, the latter serving to hold the assembly together when a bolt or connecting link 31 is inserted through openings 32 in each of the end walls and passing through a bore 33 in the yoke. The bolt is fastened in place by suitable means such as at 34 (threaded nut) and a bolt head at 35. It is contemplated within the scope of this invention that another way can be utilized to maintain the fence element and yoke in assembled relation as long as the restrained floating condition is not destroyed or the disposition of each element on opposed sides of the belt.

Strain gauge means D is employed to sense the influence of belt tension on the geometry of the yoke as encouraged by the fence element 27. Means D is preferably comprised of four gauges, two of which sense compressive strain and the other two sense tensile "poisson" strain acting as dummy strain gauges. The four gauges are wired together in a wheatstone bridge having applied input terminals 40 and 41 and conjugate output terminals 42 and 43. Primary strain gauge 44 is placed in the arm of the bridge between terminals 40 and 42, the other primary strain gauge 45 is placed in the arm of the bridge between terminals 43 and 41. The arms are diametrically opposite in the bridge. The secondary or dummy strain gauge 46 is placed in the arm between terminals 40 and 43 and the other dummy strain gauge 47 is placed in the arm between terminals 42 and 41. Power supply conductors 48 and 49 are connected to input terminals 40 and 41, respectively, to provide a voltage source for the bridge. Output conductors 50 and 51 are connected respectively to the terminals 42 and 43 to pick up the bridge read out signal. Conductors 50 and 51 are in turn connected to suitable read out instrumentation 52 which may for example comprise an amplifier feeding to a galvanometer system.

As shown in the enlarged figure, the dummy strain gauges are adapted to sense "poisson" strain in the outer margins of the outer surface of the yoke which, being placed in the other arms of the wheatstone bridge, tend to add and augment the sensitivity of the strain gauge.

A principal contribution of the inventive device is the attainment of insensitivity to friction forces which directly affect the linearity and hysteresis of operation. This is brought about in two respects: (a) the yoke and fence element are designed to provide an abrupt change in the path of the belt through the transducer so that friction (which occurs primarily along surfaces 16 and 17) will have a direction perpendicular to the direction of extension 8 of the belt and thus no frictional component will counteract or work on the lever arms 11 and 12 against the tension in the belt which would result in an inaccurate reading; (b) since absolute perfect alignment of the device and belt surfaces is impossible, the internal surfaces of the yoke are arranged so that the predominant frictional force along surface 16 will pass (as indicated along 37) as close as possible and hopefully through the location of the primary strain gauges and thereby prevent any friction force couple from interfering. It is the frictional forces working along surfaces 16 and 17 which must be considered and which affect the accuracy of response of the transducer, the surface 16 being the predominant one because tension loads to the belt are primarily instigated from one side, presumably the right hand side as viewed in FIG. 4 for illustrative purposes. Accordingly, the crotch surface 19 in contact with the belt offers negligible friction because of the lack of movement thereacross. Similarly, the frction force, if any, developed by the belt across the bottom of feet 21 and 22 of each of the arms is also negligible.

FRICTION SENSITIVITY

Disposition and geometry of the contacting surfaces in accordance with this invention can eliminate friction sensitivity. The somewhat schematic representations of FIGS. 7a–7c depict three representative prior art devices. The views are taken through the central section of each of the devices. Nonlinearity is that deviation from the normal straight line that is plotted between applied load and the output signal of the strain gauges (as the load is increased (see FIG. 8). Hysteresis is the difference between the actual curve curing increasing load and during decreasing load.

In each of the prior art devices, a pair of side beams or plates are utilized and interconnected by an assembly or rods, sometimes carrying rollers, adapted to determine a path for a belt about the rods. Stress applied to the rods from the belt can be sensed as strain in one of the rods, or stress transmitted to the side beams can be sensed as strain.

In FIG. 7a, a device is shown utilizing three connecting rods between solid plates having means to sense strain at the base of each of the side plates; the belt is threaded as illustrated. The three cross rods 61a, 61b and 61c are utilized having their axes 63 forming an isosceles triangle, the lower of the two rods (61a and 61c) have the belt slide over them as it stretches under tension and therefore the friction force 64, developed between the belt 62 and the lower rods 61a and 61c, will play some part in counteracting the tension load and thereby effect the strain gauge signal. The friction force 64 can be visualized substantially as a tangent at the center of contact between the belt and the two rods. The force 64 has a component which is effective to counteract the tension force 64 and form a force couple about the location of strain gauges 66 embedded in the bottom lower-centered position of each of the side beams or plates. As a result of testing, the device of FIG. 7a has been shown to exhibit a maximum hysteresis of about 11.3 percent and a nonlinearity factor of about 3.5 percent and a combined error of 11.3 percent, all relative to full scale.

The device of FIG. 7b again has three rods 68a, 68b and 68c used to interconnect side beam 69. However, rather than sense stress in the side beams, the upper most rod 68b has strain gauges 70a and 70b attached to opposite central longitudinal regions of the rod and a sleeve 71 is attached thereover to allow the belt 72 to pass without interrupting the strain gauges. This device arranges the friction forces 73 so as not to form a force couple about the location of the strain gauges; the friction force 73 will be substantially tangent at a 45° angle relative to the horizontal. However, the horizontal component of the friction forces 73 does interfere with the sensitivity of the device by counteracting the tension force 74.

Nonlinearity for the embodiment of FIG. 7b, has been tested to be about 1 percent and is relatively good. However, the maximum hysteresis has been tested to be about 2.7 percent and is too high to be desirable.

In the device of FIG. 7c, stress is sensed in the side beams or plates 76 at a point in the mid region as at 77, as well as on the bottom side plates as at 78. The interconnecting rods 79a, 79 b, 79c and 79d are rigid. The use of two top rods 79b and 79c enable a transition section 82, of the belt, to apply a constant bending moment to the side plates where stress is sensed. The rather shallow offset 83 of the belt (within the transducer) makes the device extremely sensitive to belt thickness 84. Test results of this device show a maximum hysteresis of 1.2 percent and a nonlinearity factor of 3.5 percent In comparison, the inventive device exhibits a maximum hysteresis of 0.9 percent and a nonlinearity factor of 1.9 percent. It is these combined characteristics that provide the improvement in performance of this invention related to friction sensitivity since the combined error is lower than that for any of the prior art devices.

SIDE LOAD SENSITIVITY

The inventive device will be used in an operative environment such as that shown in FIG. 6, where available space is limited for the waist belt section 7 and contact forces from the dummy 5 or seat 4 are unavoidably received by the transducer 10. These limitations are also true in part for installation on the shoulder belt section 6. Since the available belt space for mounting the transducer can be extremely small, it is an advantage if the transducer has a minimal dimension along the belt extension length. It is also helpful if the transverse dimension of the belt offset within the transducer be not increased to accommodate the shortening of belt length required.

Turning in particularity to FIG. 9, there is illustrated schematically a test set-up that was used for evaluating the side load sensitivity of the inventive device or prior art devices. The belt 90 is connected at end 91 to a fixed member and at 92 to a movable member 93 adjustable to exert a predetermined tension in belt 90. A fixed pad 94 is disposed to contact the transducer 95 and a comparison test cell 96 is inserted in another section of the belt to render a true signal of applied load for comparing to the signal received from the transducer. Test results indicate that when a transducer structure as that represented in FIG. 7a is used, the structure will become intermittent in operation due to pressure being applied directly over the strain gauge area. When the prior art device of FIG. 7b is employed as the test transducer, results indicate a reversal of the direction of calibration due to the influence of the side load on the transducer itself. When a structure as in FIG. 7c is employed, the nonlinearity and hysteresis increase substantially and the device is extremely sensitive to side loading. For the inventive device test results show that the nonlinearity of tansducer to be completely independent of extraneous contact or forces.

It is apparent from FIG. 7a that inaccurate threading of the belt for this application will, of course, make the device ineffective; this is also true of the prior art devices 7a and 7b but is of a less serious nature. However, with the inventive device it is impossible to thread the belt or apply it in a wrong position of assembly. If webbing materials used remain the same thickness when under applied load, any transducer output will tend to be more linear in function. However, webbing materials do not normally maintain constant thickness under loading; some materials will decrease in thickness with applied load while others will actually increase in thickness. The difference in behavior of the webbing materials is due primarily to the weaving pattern employed. The rate of loading of the webbing secondarily affects the thickness vs. load characteristics; high dynamic loading rates normally prevent the webbing from changing thickness as drastically as when slow static loads are applied. The webbing material used in the preferred embodiment is comprised of nylon and is approximately 0.063 inch thick at no load and decreases in thickness to about 0.055 inch under a 3,500 lb. load. Since the main source of nonlinearity of the webbing and transducer system is the change in thickness of the webbing under load, it is critical that the ratio between the lever arms 14 and 15 as compared to the tolerance space remaining between the arms unoccupied by the fence element and belt thickness, such ratio should be at least 100:1 so that any friction force is prevented from forming a significant force couple about the strain gauges D. In addition, the lever arms 14 or 15 should be long relative to belt thickness and again about at 100:1.

I claim:

1. A transducer assembly for measuring loads imposed upon a seat belt having an extended disposition and having a flat web, comprising:
   a. a yoke substantially disposed on one side of said belt web having a crotch and a pair of spaced arms extending therefrom,
   b. means connected to said yoke and disposed on the other side of said belt web effective to guide a portion of said belt web between said arms so that tension in said belt will result in stress of said yoke, and
   c. means responsive to stress in said yoke to render a signal proportional thereto indicative of the load on said belt.

2. A transducer assembly as in claim 1, in which said arms and crotch define interior surfaces for said yoke against which said belt is urged by said guide means, a major proportion of said surfaces being arranged transverse to the general extent of the belt.

3. A transducer assembly as in claim 1, in which the ratio of the length of each of the lever arms to the interior spacing between said arms is greater than 10 to 1.

4. A transducer assembly as in claim 1, in which said yoke is pivotally connected to the crotch of said yoke for being floatingly carried against said seat belt to yield to extraneous contact with any portion of the yoke and thereby protect the accuracy of said signal.

5. A transducer assembly as in claim 1, in which said seat belt has a flat configuration, and the yoke has an outer curved wall having a width greater than the length of each of said lever arms, said yoke has interior sidewalls disposed normal to the plane of extension of the flat belt, and the intersection between said sidewalls and the outer curved wall being relieved.

6. A transducer as in claim 1, in which said signal means comprises a plurality of strain gauges carried on said yoke effective to sense predominantly compression in said yoke upon stress of said lever arms.

7. A transducer assembly for measuring loads imposed upon a seat belt having an extended disposition and having a flat web, comprising:
   a. a yoke substantially disposed on one side of said belt web having a crotch and a pair of spaced arms extending therefrom,
   b. means connected to said yoke and disposed on the other side of said belt web effective to guide a portion of said belt web between said arms so that tension in said belt will result in stress of said yoke, said guide means extending into and between the arms of said yoke and being dimensioned to provide a space between said guide means and any of said arms no greater than twice the thickness of the belt web interposed therebetween, and
   c. means responsive to stress in said yoke to render a signal porportional thereto indicative of the load on said belt.

8. A transducer assembly as in claim 7, in which the ratio of the length of each of said arms to said space less the thickness of the belt is greater than 100 to 1.

9. A transducer for measuring stress in an extended strand, comprising:
   a. a yoke floatingly carried against one side of said strand, said yoke having yoke arms,
   b. a fence element being pivotally connected to said yoke to permit said floating relationship of said yoke with said strand, said element being nestable within said yoke and adapted to engage the other side of said strand to urge the strand into engagement with the interior of said yoke, whereby tension in said strand exerts a force at the extremity of at least one of said arms tending to move said arm away from the other arm and thereby cause compression to occur in the exterior central region of said yoke, and
   c. strain gauge means embedded in said yoke exterior central region effective to sense said compression and transmit a signal proportional to the stress therein indicative of a tension load on said strand.

10. A transducer as in claim 9, in which the residual space between said arms, not occupied by said fence element and strand thickness, is no greater than the thickness of the strand.

11. A transducer as in claim 9, in which the yoke and fence element define a strand path having parallel and normal portions taken relative to the strand extension, the parallel dimension of the strand path through said transducer being no greater than the normal dimension of said strand path.

* * * * *